(12) United States Patent
Galloway

(10) Patent No.: US 6,744,049 B2
(45) Date of Patent: Jun. 1, 2004

(54) DETECTION OF OBSTACLES IN SURVEILLANCE SYSTEMS USING PYROELECTRIC ARRAYS

(75) Inventor: John L. Galloway, Northants (GB)

(73) Assignee: Infrared Integrated Systems Limited, Towcester (GB)

(*) Notice: Subject to any disclaimer, the term of this patent is extended or adjusted under 35 U.S.C. 154(b) by 0 days.

(21) Appl. No.: 09/805,091

(22) Filed: Mar. 13, 2001

(65) Prior Publication Data

US 2002/0008202 A1 Jan. 24, 2002

(30) Foreign Application Priority Data

Mar. 13, 2000 (GB) .............................................. 0006019

(51) Int. Cl.$^7$ ................................................. G01J 5/00
(52) U.S. Cl. .................... 250/338.3; 250/332; 250/334; 250/347
(58) Field of Search .............................. 250/338.3, 332, 250/334, 347

(56) References Cited

U.S. PATENT DOCUMENTS

| 5,283,551 | A | * | 2/1994 | Guscott | ...................... | 340/567 |
| 5,668,539 | A | * | 9/1997 | Patchell | ...................... | 340/903 |
| 5,682,331 | A | * | 10/1997 | Berlin | ........................ | 702/150 |
| 5,831,669 | A | | 11/1998 | Adrain | ........................ | 348/143 |
| 6,023,061 | A | * | 2/2000 | Bodkin | ........................ | 250/332 |

FOREIGN PATENT DOCUMENTS

| DE | 198 09 210.5 | 9/1999 |
| GB | 2 305 799 A | 4/1997 |
| JP | 62-240823 | 10/1987 |
| JP | 07-050825 | 2/1995 |

OTHER PUBLICATIONS

Search Report for GB Application 0006019.4, dated Oct. 21, 2000.
U.S. patent application Ser. No. 09/558,279, Hollock et al., filed Apr. 25, 2000.
U.S. patent application Ser. No. 09/579,636, Galloway et al., filed May 26, 2000.
U.S. patent application Ser. No. 09/643,099, Galloway, filed Aug. 21, 2000.

* cited by examiner

Primary Examiner—Constantine Hannaher
Assistant Examiner—Shun Lee
(74) Attorney, Agent, or Firm—Moser, Patterson & Sheridan, L.L.P.

(57) ABSTRACT

Arrays of pyroelectric elements are used in surveillance systems by focusing the radiation from a scene on to them and examining the output from the array. If an object is moved into the scene and left stationary, it will hinder the subsequent operation of the system by masking part of the scene from the field of view of the array; this fault condition may be detected by the following procedure. At intervals arrangements are made to move the image of the scene to and from across the array using a suitable transducer and the outputs from the array are examined. The outputs from the array when the scene is in its normal condition and the image is moved across the array comprise a set of signals corresponding to a reference image, which may be compared with the corresponding outputs from the array when the image is moved across the array on a subsequent occasion. Change between the reference image signals and subsequent image signals are interpreted in terms of the introduction to, or removal of, objects from the scene.

14 Claims, 1 Drawing Sheet

DETECTION OF OBSTACLES IN SURVEILLANCE SYSTEMS USING PYROELECTRIC ARRAYS

BACKGROUND OF THE INVENTION

1. Field of the Invention

The present invention generally relates to a passive infrared detectors (PIR) detectors utilising the pyroelectric effect are widely used to detect changes in the temperature of a scene, and thereby to detect fire, intruders or other dynamic events. When the infrared detectors are formed into an array on to which a scene is focused, the events can not only be detected but also located in direction. If the image is not chopped, only dynamic events can be detected and stationary objects are ignored. One difficulty in operation of an "unchopped" array occurs when an object such as a van is moved into the field of view and left stationary, preventing the detection of events that occur behind it. The introduction of the object may occur when the detector system is not monitored, e.g. during working hours at a factory, and thus is not detected at the time. Alternatively the movement may occur while the system is monitored and so is detected as an event, but checks run to ensure that the event is one that indicates an alarm condition are negative. For example the output from an affected element may be examined for low frequency flicker characteristic of a flame, and if this is absent no alarm would be given. However fires that arise or are started subsequently, behind the obscuring object, would also not be detected until they had spread into other parts of the field. It is the prime object of this invention to provide a reference image of the scene in its normal condition so that certain changes in the scene subsequently can be detected as a fault condition in the operation of the system.

2. Description of the Related Art

SUMMARY OF THE INVENTION

The present invention generally provides a method of operating a pyroelectric array comprising a two dimensional array of detector elements onto which the image of a scene is focussed by optical means, whereby events within the scene cause temperature changes at the detector elements to produce electrical signals, wherein during normal operation the image is stationary with respect to the scene and only events within the scene cause the elements to produce electrical signals and wherein the image of the scene is displaced with respect to the array to generate a set of detector element signals corresponding to a reference image indicating the position of static objects in the scene.

The method of the invention should not be confused with the displacement of an image with respect to a detector element which occurs in a typical scanning camera. For example, JP-A-7050825 discloses a typical "line scan" camera including a linear array of detector elements in which successive parts of an image of a scene are reflected onto the detector elements by means of a moving mirror in order for the detector elements to build up a two dimensional image of the scene. With a two dimensional array of elements such scanning is not necessary since an optical image of the whole scene can be focussed onto the array. The purpose of displacing the image with respect to the array in the present invention is to cause a change in the amount of infrared radiation reaching passive elements which would not otherwise output a detection signal.

Furthermore, it should be noted that if an image is scanned across a passive infrared detector, that detector will be able to detect the positions of static objects as well as moving objects. Comparison with subsequent scans will enable moving objects to be distinguished from static objects. By contrast, in the present invention, the displacement of the image with respect to the object is not necessary during normal operation to detect moving objects.

The method of the invention is preferably carried out when the scene is known to be clear of unwanted objects. The scene in which it is required to detect events may be focussed by a lens or mirror on to the array of infrared devices which may operate in the whole or a part of the range 2–14 micrometers. The array is formed of pyroelectric detectors that detect the changes of temperature due to an event rather than the actual temperature of the elements of the scene. Suitable detector arrays will usually be rectangular and contain between eight and a hundred detectors in each dimension, corresponding in a square detector array to between sixty-four and ten thousand elements.

Subsequently if an object is introduced to the scene, the signals will be different at the edges of the object and probably within it. Thus, in order to detect the relocation, removal or introduction of static objects within the scene, a further set of detector element signals is generated by again displacing the image of the scene with respect to the array, and the resulting set of signals is compared with the signals corresponding to the reference image. This may be done at regular intervals and particularly, in the case of an array forming part of a monitoring system, when the monitoring system has just commenced operation after a period of not operating.

It should be noted that the method does not require the generation of a visible image. The detection of movement of objects can be carried out entirely by suitable signal processing. A comparison of sets of signals e.g. by subtraction of the signals from each element using a microprocessor or other electronic processor, will detect whether an obstacle has been moved into the scene under surveillance and what portion of the scene it occupies.

During normal operation (ie. no displacement) the array may be operated to detect dynamic events such as the presence of intruders, occurrence of fire or movement of people. In one possible application the array may monitor people approaching a pedestrian crossing, for example. Movements of previously static objects or introduction of objects which are then static may then be interpreted as a potential fault in the monitoring of dynamic events. In one example the object may be a parked vehicle blocking the line of vision. If desired, objects below a certain size, such as might correspond to moving the furniture in a room or the introduction of a parked cycle, can be ignored.

The occurrence of a possibly significant dynamic event would typically be indicated by an above threshold signal from an element of the array. The significance of the event may be further verified by other procedures. The displacement will typically be a vibration which will move the image of the scene a short distance to and from across the detector. Either the array or part of the optical means may be vibrated. A movement such that the image of the scene is displaced by an amount equal to the detector element pitch is sufficient. The movement may be accomplished by vibrating the array with a suitable transducer, though piezoelectric signals from the array may make this not the preferred solution. In a usually preferred embodiment a lens or mirror in the optical system is vibrated by a piezoelectric or electromagnetic transducer. In this arrangement an optical lever may be introduced to make the movement of the image larger than the movement of the transducer. In a further embodiment the movement of the image is accomplished by passing the infrared radiation through a thin prism which can be rotated about an axis at right angles to a face. The temperature changes in the array, corresponding to the movement of the image of the scene across it, produce signals corresponding to the temperature gradient in the relevant part of the scene and thus emphasise edges of objects. As most obstacles are defined by vertical or horizontal edges a preferred axis of vibration is at 45° to the horizontal so that both horizontal and vertical edges may be detected. Alternatively two transducers may be applied to diameters of the optical element at right angles to one another and with vibrations 90° out of phase so that the image is swept round in a small circle across the array. Other methods of accomplishing the displacement could include moving wedge shaped prisms laterally into and out of the field of view of the array.

It is desirable that the set of signals corresponding to the reference image is updated at intervals, as otherwise changes in the scene associated with changes of temperature occurring naturally or due to the operation of a heating system indoors could be interpreted as an obstacle. By suitable programming such "common mode" changes can be ignored. Changes not due to an obstacle will tend to be slow and to affect the whole scene, and thus may be distinguished by a suitable algorithm from the localised rapid changes introduced by an obstacle. For example, the signals corresponding to the reference image may be updated only when the majority of detectors exhibit a change in signal and preferably only when that change is smaller than a predetermined amount, indicative of a gradual change in conditions. This "update" might take place two to four times per hour. The processor can also be programmed so that anticipated changes in the scene, induced for example by switching on a radiator, are also ignored. When an unwanted object is being introduced to the scene, it may be detected and tracked by the detector in its normal mode if the detector is switched on. This information can also be used by an algorithm to differentiate such objects from naturally occurring changes.

Although the technique has been described in terms of monitoring the introduction of an object into a scene under surveillance it is equally applicable to the removal of an object or objects from the scene. In order to optimise the technique for this application it is desirable that the object(s) should be at a detectably different temperature to its surroundings. This can be done by heating the background e.g. of a valuable object in a display case or by heating the object itself e.g. a car in a garage. In this application the removal of one or more objects from the scene may also be designated an alarm condition, rather than a fault condition of the system.

The technique described is applicable in a wide variety of applications where pyroelectric detector arrays are used to monitor events, including fire and intruder detection, traffic monitoring, the control of pedestrian crossings, and monitoring the movement of people in a building. In each case the operation of the system would be hindered by the introduction of a static obstacle or by the removal of an object normally present.

It should be clear from the foregoing that the infrared radiation falling on the array is not "chopped". In other words there is no imposed modulation as would be required for the generation of a thermal image. The only modulation during normal operation is that caused by movements within the scene.

The invention also provides apparatus for detecting events occurring within a viewed scene comprising a two dimensional array of pyroelectric detector elements and optical means for focussing an image of the scene onto the array whereby movements within the scene cause temperature changes at the detector elements, wherein during normal operation the image is stationary with respect to the scene and only events within the scene cause the elements to produce electrical signals, the apparatus having means for displacing the image of the scene with respect to the array to generate a set of detector element signals corresponding to a reference image indicating the position of static objects in the scene.

Preferred features of the apparatus are described in appended claims 13 to 19.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
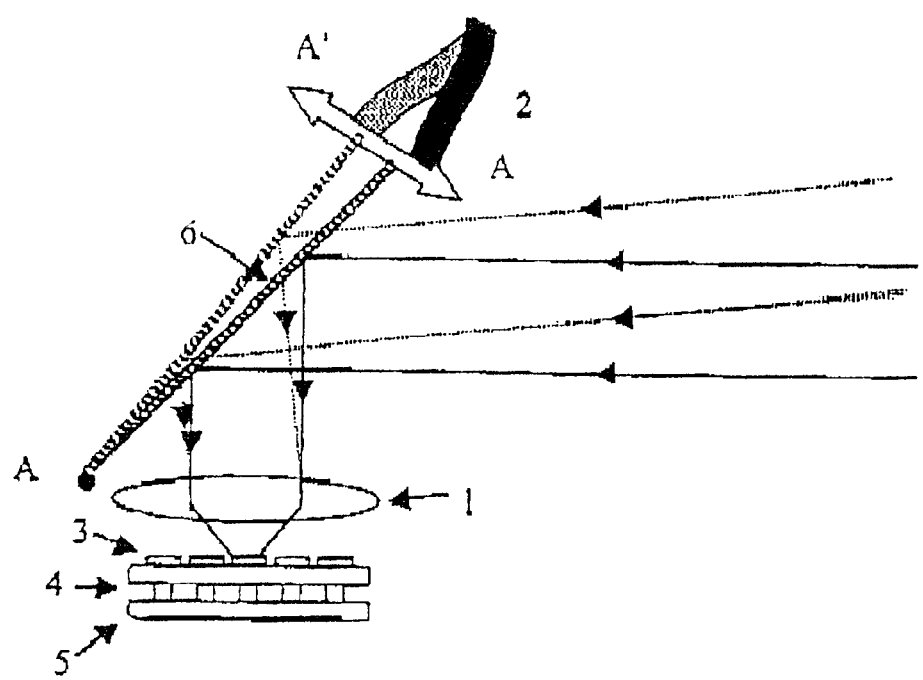

The FIG. accompanying this specification is a schematic view of the apparatus for detecting events occurring within a scene.

DETAILED DESCRIPTION OF THE PREFERRED EMBODIMENT

An embodiment of the invention will now be described by way of example only and with reference to the accompanying drawing which is a schematic view of apparatus for detecting events occurring within a scene.

Referring to FIG. 1, infrared radiation from a distant scene is focussed by a germanium lens 1 onto an array 3 of pyroelectric detector elements. The array 3 of pyroelectric elements is mounted by means of conducting silver-loaded resin pillars 4 onto an integrated circuit 5. Herein each detector element is connected to a preamplifier (not shown), and is then subject to a thresholding operation for use in the detection of significant events. A mirror 6 is mounted on an axis so that it can move from its normal position AA to a displaced position AA', which changes the part of the scene that is focussed onto a given element of the array. The solid lines indicate the rays normally focussed on one element and the dotted lines indicate rays focussed when the mirror 6 is displaced. The displacement is brought about by the action of a piezoelectric bimorph 2 that is bent by the application of a voltage across its faces, acting on the edge of the mirror 6. The solid object represents the bimorph 2 in its normal condition and the shaded object shows the bimorph when the mirror is displaced. Other rays from the scene, not shown, are normally brought to a focus on the other elements of the array and are likewise displaced by a distance comparable with the element pitch by the action of the bimorph. A low frequency alternating voltage is applied to the bimorph, which induces a corresponding vibration in the lens, and corresponding alternating movement of the image across the array.

In the normal mode of operation, a steady or zero voltage is applied to the bimorph and only events that correspond to changes in temperature of the viewed scene are detected. In the reference mode when the scene has been in a standard condition and no events are being detected, an alternating voltage is applied to the bimorph and the output signals at the frequency of the vibration from each element are amplified, converted from analogue to digital form and stored. At intervals during the subsequent operation of the system, the alternating voltage is again applied to the bimorph, and the output signals likewise stored. The stored values are subtracted from those derived from the reference image and a set of difference values is obtained. An obstacle in the scene is deemed to be present if a difference value above a pre-set value is obtained from a number, also pre-defined, of adjacent elements in the array. The obstacle represents a fault condition for the detection system, which should be distinguished from the alarm condition, which can obtain when a pre-set threshold is exceeded from an element in the absence of vibration.

While the foregoing is directed to embodiments of the present invention, other and further embodiments of the invention may be devised without departing from the basic scope thereof, and the scope thereof is determined by the claims that follow.

What is claimed is:

1. A method of operating a pyroelectric array comprising a two dimensional array of detector elements onto which the image of a scene is focused by optical means, whereby events within the scene cause temperature changes at the detector elements to produce electrical signals, wherein during normal operation the image is stationary with respect to the array, the array is operated to detect dynamic events and only events within the scene cause the elements to produce electrical signals, and wherein during a reference mode the image of the scene is displaced with respect to the array to generate a set of detector element signals corresponding to a reference image indicating the position of static objects in the scene, a further set of detector element signals is generated by again displacing the image of the scene with respect to the array, and the further set of signals corresponding to a further image is compared to the set of signals corresponding to the reference image whereby to determine whether an object has moved during the time between the acguisition of the two sets of signals.

2. A method as claimed in claim 1 in which the array is part of a surveillance system and the further set of signals is generated following a period during which the system is deactivated.

3. A method as claimed in claim 2 in which the movement of an object during said time between the acquisition of two sets of signals is interpreted as a potential fault.

4. A method as claimed in claim 3 in which the movement of objects below a certain size is ignored.

5. A method as claimed in claim 1 in which one or more selected objects within the scene are caused to have a different temperature from their background.

6. A method as claimed in claim 1 in which the array is displaced whilst the optical means remain stationary.

7. A method as claimed in claim 1 in which at least part of the optical means is displaced whilst the array remains stationary.

8. A method as claimed in claim 1 in which the set of signals corresponding to the reference image is updated at regular intervals.

9. Apparatus for detecting events occurring within a viewed scene comprising a two dimensional array of pyroelectric detector elements and optical means for focussing an image of the scene onto the array whereby movements within the scene cause temperature changes at the detector elements, wherein during normal operation the image is stationary with respect to the array and only events within the scene cause the elements to produce electrical signals, the apparatus having: means for displacing the image of the scene with respect to the array to generate a set of detector element signals corresponding to a reference image indicating the position of static objects in the scene, means for comparing the set of signals corresponding to the reference image with a further set of signals corresponding to a further image generated by a subsequent displacement of the image with respect to the array; and means for determining in response to signals from said comparison means whether an object has moved during the time between the acquisition of the two sets of signals.

10. Apparatus as claimed in claim 9 including means for storing the set of signals corresponding to the reference image.

11. Apparatus as claimed in claim 9 having means for displacing the array whilst the optical means remain stationary.

12. Apparatus as claimed in claim 9 having means for displacing at least part of the optical means whilst the array remains stationary.

13. Apparatus as claimed in claim 9 having means for identifying dynamic events whilst the array and optical means are stationary with respect to each other.

14. Apparatus as claimed in claim 9 in which said displacing means comprises a piezoelectric or electromagnetic transducer.

* * * * *